(12) United States Patent
Zheng

(10) Patent No.: US 12,164,288 B2
(45) Date of Patent: Dec. 10, 2024

(54) GOODS TRANSPORT SYSTEM AND METHOD

(71) Applicant: BEIJING GEEKPLUS TECHNOLOGY CO., LTD., Beijing (CN)

(72) Inventor: Yong Zheng, Beijing (CN)

(73) Assignee: BEIJING GEEKPLUS TECHNOLOGY CO., LTD., Beijing (CN)

(*) Notice: Subject to any disclaimer, the term of this patent is extended or adjusted under 35 U.S.C. 154(b) by 897 days.

(21) Appl. No.: 17/289,246

(22) PCT Filed: Sep. 17, 2019

(86) PCT No.: PCT/CN2019/106152
§ 371 (c)(1),
(2) Date: Apr. 28, 2021

(87) PCT Pub. No.: WO2020/088132
PCT Pub. Date: May 7, 2020

(65) Prior Publication Data
US 2021/0395008 A1    Dec. 23, 2021

(30) Foreign Application Priority Data
Oct. 30, 2018  (CN) .......................... 201811279862.7

(51) Int. Cl.
*G05B 19/418* (2006.01)
*B25J 9/16* (2006.01)
(Continued)

(52) U.S. Cl.
CPC ...... *G05B 19/41895* (2013.01); *B25J 9/1661* (2013.01); *B25J 9/1664* (2013.01);
(Continued)

(58) Field of Classification Search
CPC ...... B65G 1/0492; B65G 1/1378; B65G 1/04; B65G 1/1373; B65G 1/137; B66F 9/063;
(Continued)

(56) References Cited

U.S. PATENT DOCUMENTS 9,463,927 B1 * 10/2016 Theobald ............. B65G 1/1373
9,786,187 B1 * 10/2017 Bar-Zeev ............... G05D 1/104
(Continued)

FOREIGN PATENT DOCUMENTS

CN    104525488 A    4/2015
CN    105858045 A    8/2016
(Continued)

*Primary Examiner* — Thomas Randazzo
(74) *Attorney, Agent, or Firm* — Bayramoglu Law Ofices LLC

(57) ABSTRACT

The system comprises: control servers, transport robots, and workstations, the workstations comprising working areas and waiting areas. The control servers are configured to determine a target container to be transported, a first transport robot and a second transport robot that transport the target container, and a target workstation that operates the target container in response to a system task, plan walking paths for the first transport robot and the second transport robot, and send transport instructions to the first transport robot and the second transport robot. The first transport robot is configured to transport the target container from a storage area to a waiting area of the target workstation according to a planned walking path in response to a transport instruction, place same in the waiting area of the target workstation, and wait to execute other transport instructions.

17 Claims, 7 Drawing Sheets

(51) Int. Cl.
  *B65G 1/04* (2006.01)
  *B66F 9/06* (2006.01)
  *G05D 1/00* (2024.01)
  *G06Q 10/087* (2023.01)

(52) U.S. Cl.
  CPC ............ *B65G 1/0492* (2013.01); *B66F 9/063* (2013.01); *G05D 1/0297* (2013.01); *G06Q 10/087* (2013.01)

(58) Field of Classification Search
  CPC ........... G05B 19/41895; G05D 1/0297; G06Q 10/087; B25J 9/1661; B25J 9/1664
  See application file for complete search history.

(56) References Cited

U.S. PATENT DOCUMENTS

| | | | |
|---|---|---|---|
| 9,827,683 B1* | 11/2017 | Hance | B25J 5/007 |
| 9,908,696 B1* | 3/2018 | Zevenbergen | G06Q 10/087 |
| 9,952,589 B1* | 4/2018 | Brazeau | B66F 9/063 |
| 10,026,044 B1 | 7/2018 | Wurman et al. | |
| 11,630,447 B1* | 4/2023 | Bhaskaran | G05D 1/0088 |
| | | | 700/245 |
| 2003/0220715 A1* | 11/2003 | Kneifel, II | G05B 19/41815 |
| | | | 700/248 |
| 2008/0222883 A1* | 9/2008 | Ono | B23Q 7/04 |
| | | | 29/787 |
| 2014/0365258 A1* | 12/2014 | Vestal | G06Q 10/063114 |
| | | | 901/1 |
| 2015/0269521 A1* | 9/2015 | Knapp | G06Q 10/08355 |
| | | | 705/338 |
| 2016/0129592 A1* | 5/2016 | Saboo | B25J 5/007 |
| | | | 700/248 |
| 2017/0267452 A1* | 9/2017 | Goren | B65G 1/0492 |
| 2017/0320669 A1* | 11/2017 | Kilibarda | B65G 13/02 |
| 2017/0336780 A1 | 11/2017 | Wise et al. | |
| 2019/0317486 A1* | 10/2019 | Ghanem | G05B 19/4183 |
| 2019/0367275 A1* | 12/2019 | Hoffman | B65G 1/1373 |
| 2020/0118222 A1* | 4/2020 | Bidram | G05B 19/41865 |
| 2020/0242544 A1* | 7/2020 | Galluzzo | B25J 9/1692 |
| 2020/0315099 A1* | 10/2020 | Bidram | B25J 9/1679 |

FOREIGN PATENT DOCUMENTS

| | | |
|---|---|---|
| CN | 205837747 U | 12/2016 |
| CN | 107398426 A | 11/2017 |
| CN | 107472787 A | 12/2017 |
| CN | 107918802 A | 4/2018 |
| CN | 108672308 A | 10/2018 |
| CN | 109279252 A | 1/2019 |
| EP | 2209596 A1 | 7/2010 |
| JP | 2016055963 A | 4/2016 |
| JP | 2019003602 A | 1/2019 |

* cited by examiner

GOODS TRANSPORT SYSTEM AND METHOD

CROSS REFERENCES TO THE RELATED APPLICATIONS

The present application is a national phase entry under 35 U.S.C. § 371 of International Application No. PCT/CN2019/106152, filed on Sep. 17, 2019, which claims the priority from Chinese Patent Application No. 201811279862.7, filed with the Chinese Patent Office on Oct. 30, 2018 and entitled "Goods Transport System and Method", which is hereby incorporated by reference in its entirety.

TECHNICAL FIELD

The present invention relates to the field of logistics and warehousing technology, and in particular to a goods transport system and method.

BACKGROUND

The rapid development of e-commerce and online shopping, not only brings unprecedented development opportunities to the logistics industry, which is a key point of the e-commerce and online shopping, but also poses severe challenges to the logistics industry.

At present, in the "goods-to-person" system, carrying robots are used to transport storage containers storing goods to workstations, so that workers or robots can process the goods. Compared with the traditional "people-to-goods" system, the "goods-to-people" system improves the work efficiency and automation.

While, in the goods transport process, after a carrying robot transports the target goods to a workstation, if the waiting area of the target workstation is not empty at this time, that is, there is at least one carrying robot in the waiting area of the target workstation, then the carrying robot needs to wait in line in the waiting area of the target workstation until the target goods is transported from the waiting area to the working area of the target workstation. However, when the carrying robot is waiting in line, there is no way to transport other goods, thereby reducing the working efficiency of the carrying robot.

SUMMARY

The goods transport system and method provided by the embodiments of the present invention can improve the working efficiency of the carrying robot.

In a first aspect, an embodiment of the present invention provides a goods transport system, which includes: a control server, carrying robots, and a workstation that includes a working area and a waiting area;

the control server is configured to: in response to a system task, determine a target container to be transported, first and second carrying robots for transporting the target container and a target workstation for operating on the target container, plan a moving path for the first carrying robot and a moving path for the second carrying robot, and send transport instructions to the first and second carrying robots;

the first carrying robot is configured to: in response to a transport instruction, transport the target container from a storage area to a waiting area of the target workstation according to the moving path for the first carrying robot, and place the target container in the waiting area of the target workstation, so as to wait for and execute other transport instructions after placement;

the second carrying robot is configured to: in response to a transport instruction, transport the target container from the waiting area to a working area of the target workstation according to the moving path for the second carrying robot.

Further, the second carrying robot is further configured to: keep docking with the target container all along during an operation on the target container.

Further, the second carrying robot is further configured to: transport the target container from the working area of the target workstation to the storage area after the operation on the target container has been completed; or transport the target container from the working area to the waiting area of the target workstation, and place the target container in the waiting area of the target workstation, so as to wait for and execute other transport instructions after placement.

Further, the control server is further configured to: determine a third carrying robot for transporting the target container, plan a moving path for the third carrying robot, and send a transport instruction to the third carrying robot;

the third carrying robot is configured to: in response to the transport instruction for the third carrying robot, transport the target container from the waiting area of the target workstation to the storage area.

Further, the second carrying robot is further configured to: place the target container in the working area of the target workstation after transporting the target container from the waiting area to the working area of the target workstation, so as to wait for and execute other transport instructions after placement.

Further, the control server is further configured to: determine a fourth carrying robot for transporting the target container, plan a moving path for the fourth carrying robot, and send a transport instruction to the fourth carrying robot;

the fourth carrying robot is configured to: in response to the transport instruction for the fourth carrying robot, transport the target container from the working area of the target workstation to the storage area.

Further, the control server is further configured to: if it is detected that there are a predetermined number of first carrying robots in the waiting area of the target workstation or the waiting time of the first carrying robot in the waiting area of the target workstation is greater than a preset duration, send other transport instructions to the first carrying robot.

In a second aspect, an embodiment of the present invention further provides a goods transport method, which includes:

in response to a system task, a control server determines a target container to be transported, first and second carrying robots for transporting the target container and a target workstation for operating on the target container, determines a moving path for the first carrying robot, and sends a first transport instruction to the first carrying robot;

in response to the first transport instruction, the first carrying robot transports the target container from a storage area to a waiting area of the target workstation according to the moving path for the first carrying robot, and places the target container in the waiting area of the target workstation, so as to wait for and execute other transport instructions after placement;

the control server determines a second carrying robot for transporting the target container, plans a moving path for the second carrying robot, and sends a second transport instruction to the second carrying robot;

in response to the second transport instruction, the second carrying robot transports the target container from the waiting area to a working area of the target workstation according to the moving path for the second carrying robot, so as to perform operations on the target container.

Further, the second carrying robot keeps docking with the target container all along during an operation on the target container.

Further, the control server sends a third transport instruction to the second carrying robot after detecting that the operation on the target container has been completed;

in response to the third transport instruction, the second carrying robot transports the target container from the working area of the target workstation to the storage area; or transports the target container from the working area to the waiting area of the target workstation, and places the target container in the waiting area of the target workstation, so as to wait for and execute other transport instructions after placement.

Further, after the second carrying robot transports the target container from the working area to the waiting area of the target workstation and places the target container in the waiting area of the target workstation, the method further includes:

the control server determines a third carrying robot for transporting the target container, plans a moving path for the third carrying robot, and sends a fourth transport instruction to the third carrying robot;

in response to the fourth transport instruction, the third carrying robot transports the target container from the waiting area of the target workstation to the storage area.

Further, after the second carrying robot transports the target container from the waiting area to the working area of the target workstation according to the planned moving path in response to the second transport instruction, the method further includes:

the control server sends a placing instruction to the second carrying robot;

the second carrying robot places the target container in the working area of the workstation, so as to wait for and execute other transport instructions after placement.

Further, after the second carrying robot places the target container in the working area of the workstation, the method further includes:

the control server determines a fourth carrying robot for transporting the target container, plans a moving path for the fourth carrying robot, and sends a fifth transport instruction to the fourth carrying robot;

in response to the fifth transport instruction, the fourth carrying robot transports the target container from the working area of the target workstation to the storage area.

Further, after the first carrying robot transports the target container from the storage area to the waiting area of the target workstation according to the planned moving path in response to the first transport instruction, the method further includes:

the control server sends other transport instructions to the first carrying robot if it is detected that there are a predetermined number of first carrying robots in the waiting area of the target workstation or the waiting time of the first carrying robot in the waiting area of the target workstation is greater than a preset duration;

after receiving the other transport instructions, the first carrying robot places the target container in the waiting area of the target workstation and executes transport operations in the other transport instructions.

In a third aspect, an embodiment of the present invention provides a goods transport control method, including:

in response to a system task, determining a target container to be transported, first and second carrying robots for transporting the target container and a target workstation for operating on the target container, determining a moving path for the first carrying robot, and sending a first transport instruction to the first carrying robot, wherein the first transport instruction is used to instruct the first carrying robot to transport the target container from a storage area to a waiting area of the target workstation according to the moving path for the first carrying robot and place the target container in the waiting area of the target workstation;

determining a second carrying robot for transporting the target container, planning a moving path for the second carrying robot, and sending a second transport instruction to the second carrying robot, wherein the second transport instruction is used to instruct the second carrying robot to transport the target container from the waiting area to a working area of the target workstation according to the moving path for the second carrying robot.

In a fourth aspect, an embodiment of the present invention provides a carrying robot group;

wherein a first carrying robot in the carrying robot group is configured to: in response to a transport instruction, transport a target container from a storage area to a waiting area of a target workstation according to a moving path for the first carrying robot, and place the target container in the waiting area of the target workstation for waiting for and executing other transport instructions;

a second carrying robot in the carrying robot group is configured to: in response to a transport instruction for the second carrying robot, transport the target container from the waiting area to a working area of the target workstation according to a moving path for the second carrying robot.

In a fifth aspect, an embodiment of the present invention provides an electronic device, including: one or more processors; and a storage device for storing one or more programs, wherein the one or more programs cause the one or more processors to implement the goods transport method described above when executed by the one or more processors.

In a sixth aspect, an embodiment of the present invention provides a computer readable storage medium storing a computer program thereon, where the program implements the goods transport method described above when executed by a processor.

In the technical solution provided by the embodiments of the present invention, the waiting area in the workstation is taken as the transit station that stores the target container temporarily through the control of the control server. After transporting the target container from the storage area to the waiting area of the target workstation, the first carrying robot does not need to wait in line and can perform the next transport task; and the second carrying robot transports the target container from the waiting area to the working area in order to operate the target container. Compared with the existing transport solution of the carrying robot, the carrying robot is always in a highly operating state, improving the working efficiency of the carrying robot.

BRIEF DESCRIPTION OF THE DRAWINGS

By reading the detailed description of the non-limiting embodiments with reference to the following drawings, other features, purposes and advantages of the present invention will become more apparent.

DETAILED DESCRIPTION OF THE EMBODIMENTS

Figure 1A:
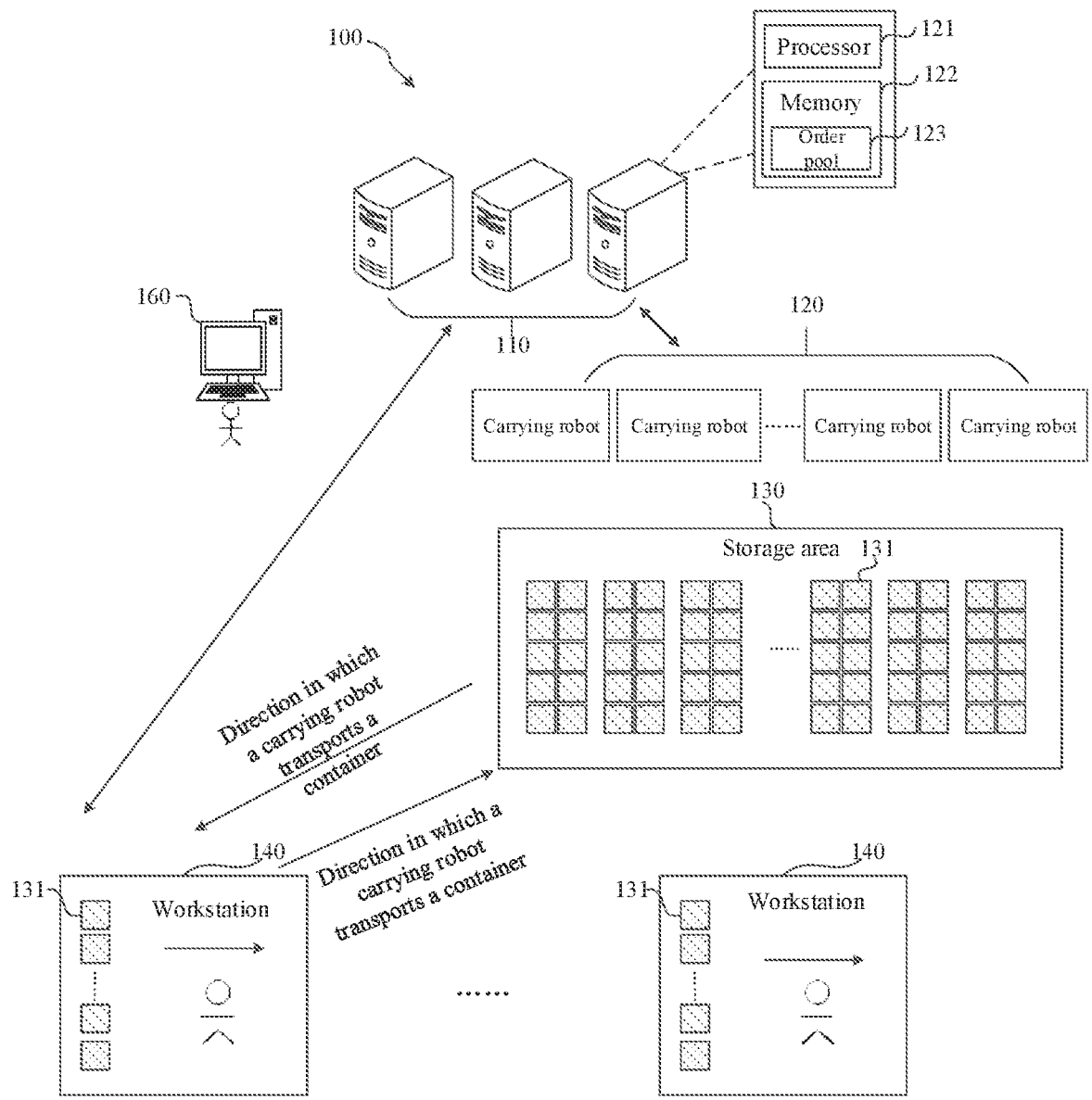
FIG. 1A is a structural schematic diagram of a goods transport system provided in an embodiment of the present invention.

Before the embodiments of the present invention are introduced, the application scenarios of the embodiments of the present invention will be explained. The goods transport scheme of the embodiments of the present invention can be applied to any scene where goods need to be transported, such as goods picking process, stock-taking process, loading process or replenishment process, etc. The goods represents any article suitable for storing, sorting or transferring in an automated inventory, warehouse, manufacturing and/or part processing system, can be any material, and can be a living or inanimate object. As an example, the goods may represent a commodity stored in the warehouse.

A goods transport system is provided in detail below. For details, please refer to the structural schematic diagram of the goods transport system shown in FIG. 1A. The system 100 includes: a computing device 110, carrying robots 120, a storage area 130, and workstations 140; wherein the computing device 110 can be any type of stationary or mobile computing device, including mobile computer or mobile computing device (for example, tablet computer, personal digital assistant, laptop computer, notebook computer, netbook, etc.), mobile phone (for example, smart phone), wearable computing device (for example, smart watch, smart glasses, etc.) or other types of mobile devices, or a stationary computing device such as desktop computer or PC. The computing device 110 may also be a mobile or stationary server. In the embodiment of the present application, the description is made by taking the computing device 110 as a control server as an example.

The storage area 130 is provided with a plurality of containers 131, and various goods are placed on the containers 131. The container 131 can be any device that can accommodate goods, such as shelf, pallet, bin or cart, etc. A plurality of containers 131 may be arranged into a container group, and the container groups are arranged in an array form. Generally, one or more workstations 140 are provided on one side of the storage area 130, and any one or more operations, such as loading, replenishing, stock-taking or picking goods, can be performed at the workstation 140. For example, the workstation 140 may also be called a picking station in the picking scene.

The control server 110 communicates respectively with the carrying robots 120 wirelessly. The worker can make the control server 110 work through the console 160, and the carrying robots 120 perform the corresponding actions under the control of the control server 110. For example, the control server 110 plans a moving path for a carrying robot 120 according to a system task, and the carrying robot 120 moves along an empty space (a part of the passageway of the carrying robot 120) in the container array according to the moving path. In order to facilitate planning the moving path for the carrying robot 120, the working area of the carrying robot 120 (the working area includes at least the storage area 130 and the area where the workstation 140 is located) is divided into several sub-areas (for example, cells) in advance, and the carrying robot 120 moves per sub-area to thereby form a moving track.

The carrying robot 120 may be a robot for transporting containers. In an example, referring to FIG. 1B, the carrying robot 120 may include a driving mechanism 101, through which the carrying robot 120 can move in the working space. The carrying robot 120 may further include a lifting mechanism 102 for transporting containers. The carrying robot 120 may move under a container, use the lifting mechanism 102 to lift the container, and transport it to the workstation 140. When the lifting mechanism 102 rises, it can raise the entire container away from the ground, so that the carrying robot 120 can transport the container. When the lifting mechanism 102 declines, it places the container on the ground. The carrying robot 120 may also include a target identifying component 103, which can effectively identify the container.

In addition, if it is based on the visual navigation, the carrying robot 120 further includes a navigation recognition component (such as a camera, not shown in FIG. 1B) configured to identify the navigation mark (such as two-dimensional code) on the ground. Of course, the carrying robot 120 further includes a control module (not shown in FIG. 1B) that controls the entire carrying robot to realize functions such as movement and navigation. In an example, the carrying robot 120 can drive forward according to the two-dimensional code information (or other ground marks) captured by the camera, and can drive under the container indicated by the control system 110 according to the path determined by the control system 110. The carrying robot 120 transports the container to the workstation 140 for operations, including but not limited to: loading, replenishing, picking, stock-taking goods. For example, in a sorting scene, the workstation is a sorting station, where a person or sorting equipment (such as robotic arm) picks goods from the container and put them into the turnover boxes on the put wall for packing.

Figure 1B:
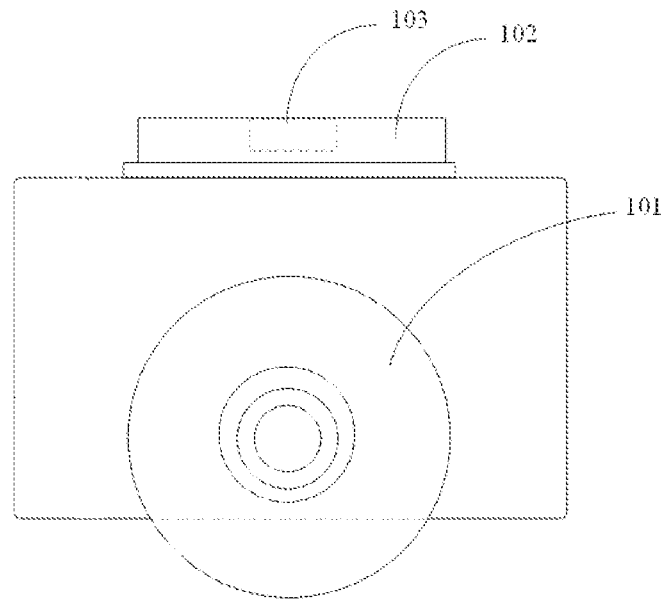
FIG. 1B is a structural schematic diagram of a carrying robot applied in an embodiment of the present invention.
Figure 1C:
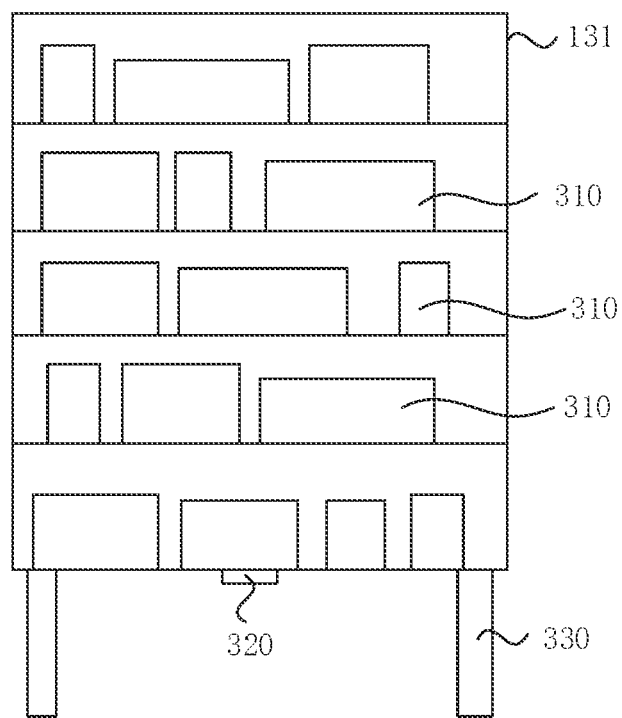
FIG. 1C is a schematic diagram of a container applied in an embodiment of the present invention.

FIG. 1C is a schematic diagram of a container provided in an embodiment of the present invention. Referring to FIG. 1C, taking the container as a shelf as an example, a shelf 131 can contain an item 310. Of course, the item can also be placed in a bin 310, and the bin 310 is contained on the shelf 131. A readable mark 320, such as a two-dimensional code, may be arranged near the bin 310. After the carrying robot 120 drives to the front of the container 131, the two-dimensional code 320 is captured by the camera to ensure that the carrying robot 120 can accurately grasp the item or bin 310. In a specific embodiment, the container 131 may be an elevated container, and includes a plurality of layers spaced and stacked in the vertical direction, each of which can accommodate a plurality of items or bins 310. In addition, the container 131 further includes one or more supporting parts 330. In a particular embodiment, the item or bin 310 can also be suspended from a hook or rod in or on the container 131. The item or bin 310 on the container 131 can be placed on the inner or outer surface of the container 131 in any suitable manner.

The control server 120 is a software system that runs on a server and has the data storage and information processing capabilities, and can be connected to access devices, carrying devices, hardware input system and other software systems in a wireless or wired way. The control server 20 may include one or more servers, and may be a centralized control architecture or a distributed computing architecture. The server has a processor 121 and a memory 122, and there may be an order pool 123 in the memory 122.

Taking the picking scene in the goods transport system shown in FIG. 1A as an example, in the traditional "goods-to-person" system, when an order item is picked each time and after a carrying robot transports the target item to the target workstation, if there is at least one carrying robot in the target workstation, this carrying robot needs to wait in line at the target workstation until the target item is transported into the working area of the target workstation. The carrying robot cannot perform other tasks during this process, resulting in the low working efficiency of the carrying robot.

On the basis of the existing "goods-to-person" system, the present invention provides a goods transport solution, which can improve the working efficiency of the carrying robot. Based on this, the technical solutions of the embodiments of the present invention are introduced below to solve this problem.

The present invention will be further described in detail below with reference to the drawings and embodiments. It can be understood that the specific embodiments described here are only used to explain the present invention, but not to limit the present invention. In addition, it should be noted that, for ease of description, the drawings only show a part but not all of the content related to the present invention.

It should be noted that similar reference numerals and letters represent similar items in the following drawings. Thus, once an item is defined in one drawing, the item does not need to be further defined and interpreted in subsequent drawings. At the same time, in the description of the present invention, the terms "first", "second", etc. are only used to distinguish the description, and cannot be understood as indicating or implying the relative importance.

First Embodiment

Figure 2A:
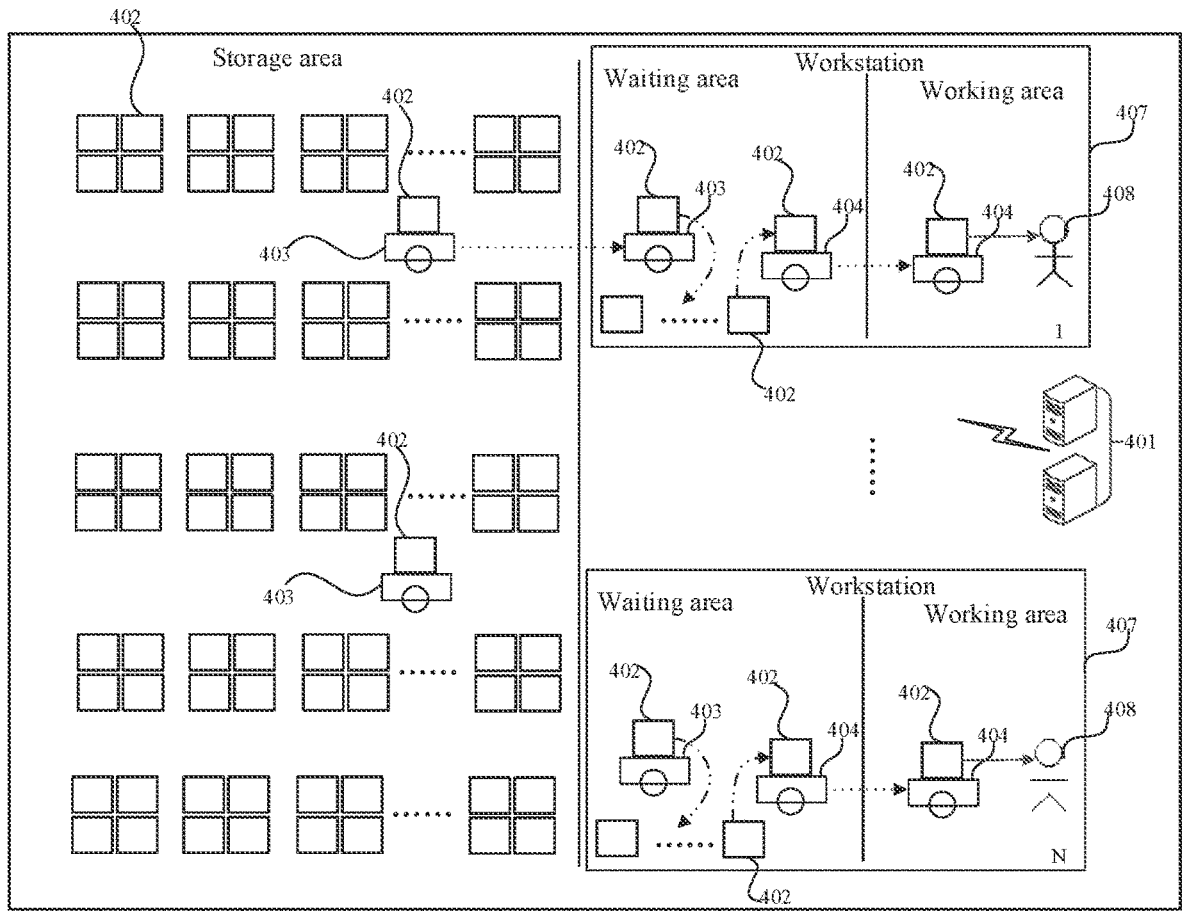
FIG. 2A is a structural schematic diagram of a goods transport system provided in a first embodiment of the present invention.

FIG. 2A is a structural schematic diagram of a goods transport system provided in the first embodiment of the present invention; and this embodiment is suitable for the case of how to improve the working efficiency of carrying robots in goods transport scenarios, and is especially suitable for the scenarios of transporting the item such as item picking, stock-taking, loading or replenishment. The entire system can be executed by a control server, at least one carrying robot and a workstation in cooperation, wherein the control server can be a single-threaded or multi-threaded server which can provide strategies for the sorting of items and the distribution of carrying robots. Referring to FIG. 2A, the system 200 specifically includes: a control server 401, carrying robots and workstations 407; the carrying robots may include a first carrying robot 403 and a second carrying robot 404. In order not to affect the work of workers or other robots in the workstation, the workstation 407 may include a working area and a waiting area; the waiting area refers to the area set in the workstation 407 where the carrying robots can queue up, the containers to be operated are temporarily stored, and the carrying robots hand over and take over, etc.; and the working area refers to the area where the worker operates the target container. Optionally, the waiting area is arranged closer to the working area so that the working area can transfer the item at any time when needed. For example, in a picking scene, the workstation 407 is a picking station, and the working area may be a picking area. The picking personnel or picking equipment (such as robotic arm) in the picking area picks items from the container.

The control server 401 may be configured to: in response to a system task, determine a target container 402 to be transported, a first carrying robot 403 and a second carrying robot 404 for transporting the target container 402, and a target workstation 407 for operating on the target container 402; plan moving paths for the first carrying robot 403 and the second carrying robot 404; and send transport instructions to the first carrying robot 403 and the second carrying robot 404.

The first carrying robot 403 is configured to: in response to a transport instruction, transport the target container 402 from the storage area to the waiting area of the target workstation 407 according to the planned moving path, and place the target container 402 in the waiting area of the target workstation 407, so as to wait for and execute other transport instructions after placement.

The second carrying robot 404 is configured to: in response to a transport instruction, transport the target container 402 from the waiting area to the working area of the target workstation 407 according to the planned moving path.

In this embodiment, the system task refers to the work task issued by the upstream system to the control server 401, and may be a picking task, a replenishing task, a stock-taking task, a loading task, and so on. The target container 402 refers to an equipment that contains items associated with system tasks, such as shelf, pallet, bin or cage, etc; and the operations on the target container 402 may include loading, replenishment, stock-taking or picking, etc. Optionally, the operations on the target container 402 are different for different system tasks; different workstations 407 may correspond to different operations, and the same workstation 407 may correspond to different operations in different scenarios.

Figure 2B:
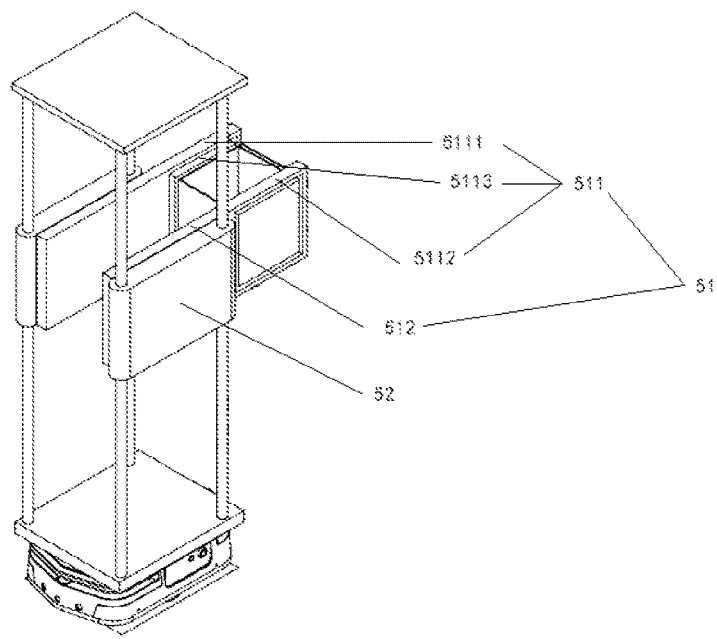
FIG. 2B is a structural schematic diagram of a carrying robot with a grasping device applied in an embodiment of the present invention.

In this embodiment, the first carrying robot 403 and the second carrying robot 404 having the same structure are used to cooperate to transport the target container 402. Optionally, in this embodiment, carrying robots with different structures may be selected to perform the transport operation according to the target container 402 that needs to be transported. Specifically, if the target container 402 is a shelf (provided with no baffle), a pallet shelf (at least one pallet is arranged on each layer of the shelf), a baffle shelf (provided with baffles, where at least one bin is arranged on each baffle, and the bin accommodates an item) or a cage trolley, then the first carrying robot 403 and the second carrying robot 404 having the structure of the carrying robot shown in FIG. 1B can be selected to cooperate to perform the transport operation; if the target container 402 is a bin (e.g., a bin placed on the baffle shelf), then the first carrying robot and the second carrying robot with the grabbing device as shown in FIG. 2B can be selected to cooperate to perform the transport operation. Specifically, as shown in FIG. 2B, the lifting mechanism in the carrying robot shown in FIG. 1B can be removed, and one grabbing component for grabbing bins is added for replacement. In an embodiment of the present application, the grasping component may include a telescopic assembly 51 that is used to grasp the container 402 or the item in the container. The grasping component further includes a lifting assembly 52 that raises and/or lowers the telescopic assembly 51 to the preset height. The telescopic assembly 51 includes a clamping part 511 and a sliding part 512. The clamping part 511 grabs the container 402 such as a bin or an item from the storage area by clamping, the clamping part 511 is slidingly connected to the sliding part 512, and the clamping part 511 can slide in the depth direction of the shelf interlayers through the sliding part 512. The clamping part 511 may include a first gripper 5111 and a second gripper 5112 that are oppositely arranged on left and right sides of the interlayers. The first gripper and the second gripper may be plate-like structures, as shown in FIG. 2B, or may be other structures, such as rod-like structures. The clamping part 511 further includes non-slip mats 5113 arranged inside the first gripper 5111 and the second gripper 5112 respectively, where the non-slip mats 5113 are foldable. When the clamping part 511 does not grasp a container or an item, the non-slip mats 5113 are folded; and when the clamping part 511 grasps a container, the non-slip mats 5113 expand. In addition, if the target container 402 is a pallet (e.g., a pallet placed on a pallet shelf), the first carrying robot and the second carrying robot with the forklift structure can also be selected to cooperate to perform the transport operation.

The transport instruction refers to an instruction issued by the control server 401 to the carrying robot to transport the target container 402. The transport instruction may include the moving path of the carrying robot, the identifier of the target container 402, the identifier of the workstation 407, and the identifier of the waiting area or working area, etc. Optionally, the transport instruction issued to the first carrying robot 403 may be used as the first transport instruction, which may include the identifier of the target container 402, the moving path from the position of the first carrying robot 403 to the target container 402 in the storage area, the moving path from the position of the target container 402 in the storage area to the waiting area of the target workstation 407, the identifier of the target workstation 407, and the identifier of the waiting area, etc.; and correspondingly, the transport instruction issued to the second carrying robot 404 may be used as the second transport instruction, which may include the identifier of the target container 402, the moving path from the position of the second carrying robot 404 to the target container 402 in the waiting area, the moving path from the target container 402 in the waiting area to the worker 408 in the work area, the identifier of the working area and the identifier of the waiting area, etc.

Exemplarily, the identifier of the target container 402 may be a two-dimensional code or other graphic mark similar to a two-dimensional code, or may be an RFID or other electronic tag with a wireless transmission function similar to the RFID. The carrying robot can identify the target container 402 through the identifier of the target container 402, and then perform the transport operation on the target container 402. The identifier of the waiting area or working area refers to a mark that uniquely refers to an area, and may be the area number, geographic location, or iconic thing such as article and the placement of article, etc.

The specific operation process will be described below in detail by taking the picking scene as an example. Of course, the solution of this embodiment is not limited to the picking scene, and can also be applied to loading, replenishment, stock-taking or other operation scenarios. Referring to FIG. 2A, the specific operation process may be: when a new order to be sorted is generated, the upstream system sends a picking task including the information about the order to be sorted to the control server 401; after receiving the sorting task issued by the upstream system, the control server 401, in response to the sorting task, obtains the corresponding warehousing information according to the information about the order to be sorted, and determines a target container 402 to be transported hit by the system task and a target workstation 407 for operating on the target container 402 according to the warehousing information of the order to be sorted, the order information and the picking strategy, etc.; and then the control server 401 determines a first carrying robot 403 and a second carrying robot 404 and the moving paths thereof based on the shortest path principle and the working status of each carrying robot, and sends a transport instruction to the first carrying robot 403. In response to the transport instruction, the first carrying robot 403 drives to the position of the target container 402 in the storage area according to the autonomous navigation function as well as the identifier of the target container 402 and the moving path contained in the transport instruction, and may utilize a structure (such as a grabbing device) arranged on it to obtain the target container 402 (such as a bin) or utilize the lifting mechanism 102 to lift up the target container 402 (such as a shelf); and then transports the target container 402 from the storage area to the waiting area in the target workstation 407 according to the indication such as the moving path, the identifier of the target workstation and the identifier of the waiting area in the transport instruction, and places the target container 402 in the designated area in the waiting area. At this time, the first carrying robot 402 can continue to respond to other transport instructions sent by the control server 401, for example, transport the empty target container 402 in the waiting area back to the storage area, etc. When detecting that the target workstation 407 needs to pick the item in the target container 402, the control server 401 sends a transport instruction to the second carrying robot 404; and in response to the transport instruction, the second carrying robot 404 drives to the position of the target container 402 in the waiting area according to the indication of the transport instruction, gets the target container 402, and then transports the target container 402 from the waiting area to the designated worker 408 or picking equipment (such as robotic arm) in the working area, so that the worker 408 or picking equipment (such as robotic arm) sorts the item in the target container 402.

It should be noted that the second carrying robot 404 and the moving path may also be determined by the control server 401 when detecting that the first carrying robot 403 has transported the target container 402 to the waiting area or is about to transport it to the waiting area; or when the control server 401 detects that the target workstation 407 needs to pick the item in the target container 402, the second carrying robot 404 for transporting the target container 402 and the moving path of the second carrying robot 404 are determined in real time according to the shortest path principle and the working status of each carrying robot.

In order to improve the working efficiency of the carrying robot, in this embodiment, after determining the target workstation, the control server 401 can detect the situation in the workstation 407 in real time, to ensure that the number of first carrying robots 403 in the queuing and waiting state in the waiting area does not exceed the predetermined value or the phenomenon that the first carrying robot 403 waits in line will not appear in the waiting area, so that the first carrying robot 403 is always in the transport state, thereby improving its work efficiency. Optionally, the control server 401 may further be configured to: if it is detected that there are a predetermined number of first carrying robots 403 in the waiting area of the target workstation or the waiting time of the first carrying robot 403 in the waiting area of the target workstation 407 is greater than a preset duration, send other transport instructions to the first carrying robot 403.

In this embodiment, the predetermined number is predetermined and can be dynamically adjusted according to the actual situation; correspondingly, the preset duration is also a preset parameter and can be dynamically adjusted according to the actual situation; it is also possible to adjust the predetermined number and preset duration at the same time based on the current situation of the workstation 407. Specifically, when the control server 401 detects that the first carrying robot 403 for transporting the target container 402 this time is in the queuing and waiting state, the control server 401 sends other transport instructions to the first carrying robot 403. Exemplarily, the control server 401 may determine that the first carrying robot 403 is in the queuing and waiting state in the following manner:

1) after the first carrying robot 407 transports the target container 402 to the waiting area of the target workstation 407, the control server 401 detects that the number of first carrying robots 403 waiting in line before this first carrying robot 403 is greater than a set value, and then determines that the first carrying robot 403 is in the queuing and waiting state;

2) if the control server 401 detects that the number of first carrying robots 403 waiting in line before this first carrying robot 403 is less than or equal to the set value but the waiting time of the first carrying robot 403 in the waiting area is greater than the preset duration, then the control server 401 can also determine that the first carrying robot 403 is in the queuing and waiting state.

Specifically, if the control server 401 detects that the first carrying robot 403 transports the target container from the storage area to the waiting area of the target workstation 407, the control server 401 detects the current state of the first carrying robot 403; if it detects that the first carrying robot 403 is the queuing and waiting state, it sends other transport instructions to the first carrying robot 403; and in response to the other transport instructions, the first carrying robot 403 places the target container 402 at a designated position in the waiting area, and transport instructions in the other transport instructions according to the indication of the other transport instructions. If it is detected that the first carrying robot 403 is not in the queuing and waiting state, the first carrying robot 403 can also directly transport the target container 402 from the waiting area to the working area without the cooperation of the additional second carrying robot 404 when detecting that the target workstation 407 needs to operate the target container 402 transported by the first carrying robot 403. Furthermore, if the first carrying robot 403 only works from the storage area to the waiting area of the workstation 407, the control server 401 can also schedule the second carrying robot 404 to directly obtain the target container 402 from the first carrying robot 403, and then transports the target container 402 from the waiting area to the working area.

In the technical solution provided by the embodiments of the present invention, the waiting area in the workstation is taken as the transit station that stores the target container temporarily through the control of the control server. After transporting the target container from the storage area to the waiting area of the target workstation, the first carrying robot does not need to wait in line and can perform the next transport task; and the second carrying robot transports the target container from the waiting area to the working area in order to operate the target container. Compared with the existing transport solution of the carrying robot, the carrying robot is always in a highly operating state, improving the working efficiency of the carrying robot.

Second Embodiment

Figure 3A:
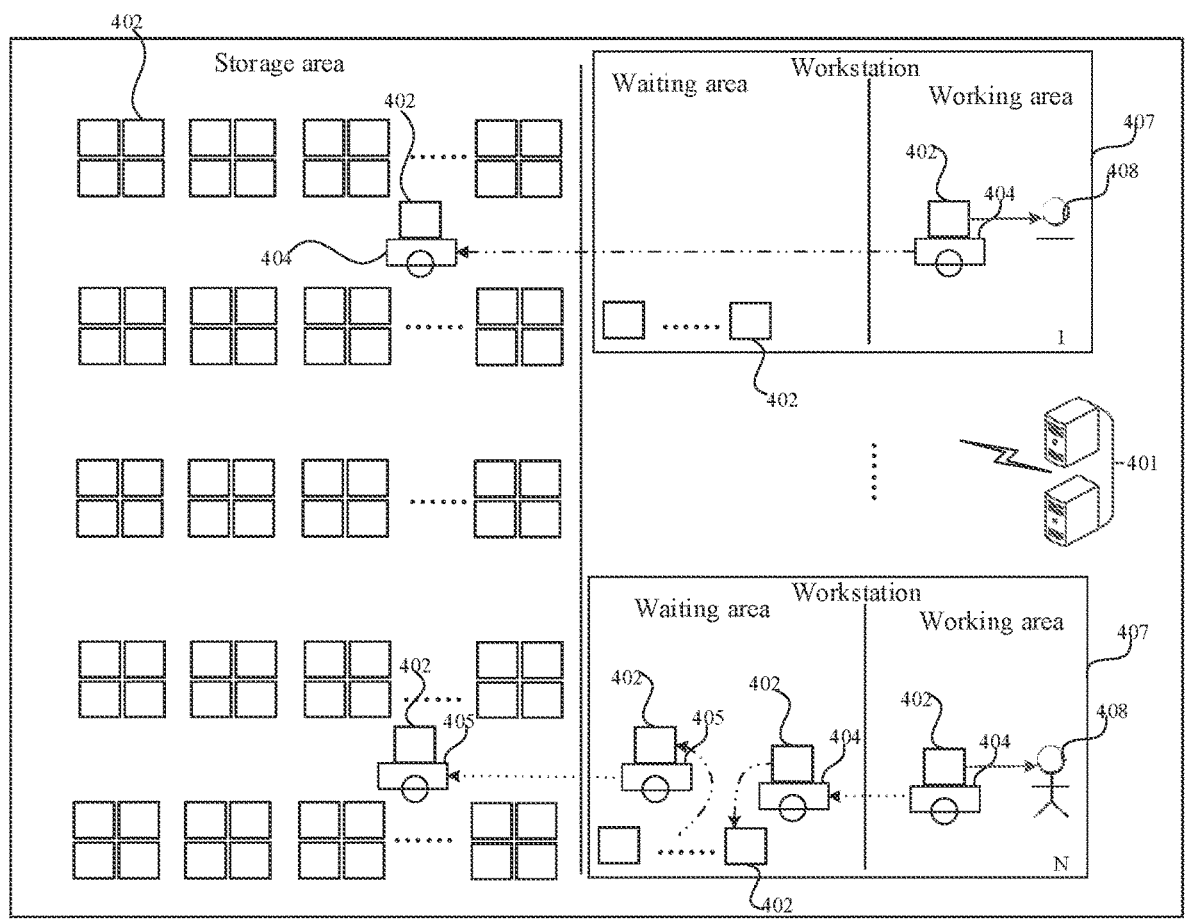
FIGS. 3A and 3B are structural schematic diagrams of a goods transport system provided in a second embodiment of the present invention.

FIG. 3A is a structural schematic diagram of a goods transport system provided in the second embodiment of the present invention; and this embodiment is further optimized on the basis of the above-mentioned embodiment. Referring to FIG. 3A, the system 200 specifically includes: a control server 401, carrying robots and workstations 407, where the carrying robots may include a first carrying robot 403 and a second carrying robot 404, and the workstation 407 may include a waiting area and a working area, wherein:

the control server 401 may be configured to: in response to a system task, determine a target container 402 to be transported, a first carrying robot 403 and a second carrying robot 404 for transporting the target container 402 and a target workstation 407 for operating on the target container 402, plan moving paths for the first carrying robot 403 and the second carrying robot 404, and send transport instructions to the first carrying robot 403 and the second carrying robot 404; the first carrying robot 403 may be configured to: in response to a transport instruction, transport the target container 402 from the storage area to the waiting area of the target workstation 407 according to the planned moving path, and place it in the waiting area of the target workstation 407, so as to wait and execute other transport instructions after placement; and the second carrying robot 404 may be configured to: in response to a transport instruction, transport the target container 402 from the waiting area to the working area of the target workstation 407 according to the planned moving path.

After transporting the target container 402 to the working area of the target workstation 407, the second carrying robot 404 may place the target container 402 directly at the designated position of the working area, so that the worker 408 can operate the target container, and the second carrying robot 404 can perform other transport operations, that is, relieve the association relationship between the second carrying robot 404 and the target container 402. It may also keep the docking with the target container 402 all the time, that is, the target container 402 always keeps the association relationship with the second carrying robot 404. In the operation process of the target container 402, the second carrying robot 404 is always at a certain position of in the working area for waiting for the completion of the operations of the target container 402, or the target container 402 is always on the second carrying robot 404, and the worker 408 performs the operations on the target container 402 directly on the second carrying robot 404.

Exemplarily, the second carrying robot 404 may further be configured to: keep docking with the target container 402 all the time in the process of operating the target container 402; or place the target container 402 in the working area of the target workstation after transporting the target container 402 from the waiting area to the working area of the target workstation 407, so as to wait for and execute other transport instructions after placement.

If the second carrying robot is configured to keep docking with the target container 402 all the time in the process of operating the target container 402, exemplarily, the second carrying robot 404 may further be configured to: transport the target container 402 from the working area of the target workstation 407 to the storage area after the operation on the target container 402 has been completed; or transport the target container 402 from the working area to the waiting area of the target workstation 407, and place the target container 402 in the waiting area of the target workstation 407, so as to wait for and execute other transport instructions after placement.

In the following, the target workstations are respectively the $1^{st}$ and $N^{th}$ workstations as an example for description. Of course, this embodiment is not limited to the $1^{st}$ and $N^{th}$ workstations, and other workstations are also applicable. Referring to FIG. 3A, the specific operation process may be: after detecting that the operation on the target container 402 has been completed, the control server 401 sends a transport instruction to the second carrying robot 404, or a worker in the working area directly sends a transport instruction to the second carrying robot 404, and the second carrying robot 404 can directly transport the target container 402 from the working area of the target workstation 407 back to the position of the target container in the storage area according to the indication of the transport instruction, as shown in the case of the first workstation in FIG. 3A. It should be noted that the moving path of the second carrying robot 404 in the actual transport process may not need to pass through the waiting area or may need to pass through the waiting area. The figure shown in this embodiment only illustrates that the second carrying robot 404 directly transports the target container 402 from the working area of the workstation back to the storage area, and does not limit the specific moving path.

In order to improve the work efficiency, the working area of the carrying robot can be divided. Optionally, the first carrying robot 403 can only work in the area between the storage area and the waiting area of the workstation 407; and the second carrying robot can only work between the working area and the waiting area in the workstation 407. The specific operation process may also be: after detecting that the operation on the target container 402 has been completed, the control server 401 sends a transport instruction to the second carrying robot 404, or a worker in the working area directly sends a transport instruction to the second carrying robot 404, and the second carrying robot 404 can directly transport the target container 402 from the working area of the target workstation 407 back to the waiting area of the target workstation 407 according to the indication of the transport instruction, and place the target container 402 at a designated position in the waiting area according to the indication of the transport instruction, so as to wait for and execute other transport instructions after placement, as shown in the case of the $N^{th}$ workstation in FIG. 3A.

In an optional implementation of the embodiment of the present invention, the carrying robots may further include a third carrying robot 405, which may have the same structure as the first carrying robot 403, and the third carrying robot 405 here may be or may not be the first carrying robot 403 that originally transported the target container 402 from the storage area to the waiting area of the target workstation 407. In addition, like the first carrying robot 403, the third carrying robot 405 can also only work in the area between the storage area and the waiting area of the workstation 407.

Exemplarily, the control server may further be configured to: determine the third carrying robot 405 for transporting the target container 402, plan a moving path for the third carrying robot, and send a transport instruction to the third carrying robot 405; and the third carrying robot 405 may be configured to: in response to the transport instruction, transport the target container 402 from the waiting area of the target workstation 407 to the storage area.

Continue to refer to the case shown in the $N^{th}$ workstation in FIG. 3A. The specific operation process may be: after detecting that the second carrying robot 404 places the target container 402 in the waiting area of the target workstation 407, the control server 401 determines the third carrying robot 405 for transporting the target container 402 and the moving path of the third carrying robot 405 based on the shortest path principle and the working status of each carrying robot, and sends a transport instruction including the identifier of the target container 402, the moving path, the identifier of the waiting area and the location of the target container 402 in the storage area, etc. to the third carrying robot 405; and in response to the transport instruction, the third carrying robot 405 gets the target container 402 from the waiting area of the target workstation 407 according to the indication of the transport instruction, and then transports the target container 402 from the waiting area back to the position where the target container 402 is stored in the storage area.

The second carrying robot 404 places the target container 402 in the working area of the target workstation after transporting the target container 402 from the waiting area to the working area of the target workstation 407, so as to wait for and execute other transport instructions after placement. In an optional implementation of the embodiment of the present invention, the carrying robots may further include a fourth carrying robot 406, which may have the same structure as the first carrying robot 403, and the working area of the carrying robot is not limited here. Therefore, the fourth carrying robot 406 may be or may not be the first carrying robot 403 that originally transported the target container 402 from the storage area to the waiting area of the target workstation 407.

Exemplarily, the control server 401 may further be configured to: determine the fourth carrying robot 406 for transporting the target container 402, plan a moving path for the fourth carrying robot 406, and send a transport instruction to the fourth carrying robot 406; and the fourth carrying robot 406 is configured to: in response to the transport instruction, transport the target container 402 from the working area of the target workstation 407 to the storage area.

Figure 3B:
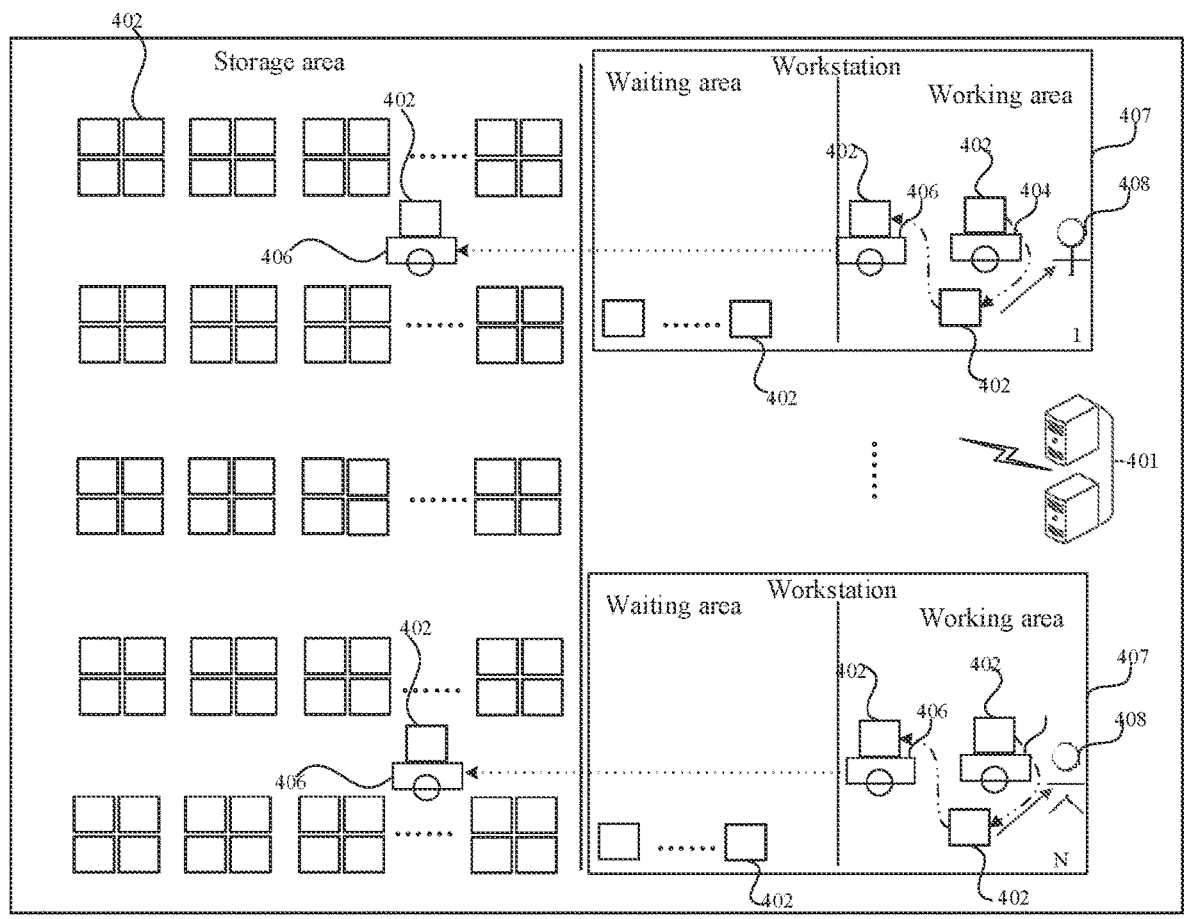

Referring to the case shown in FIG. 3B, the specific operation process may be: after detecting that the second carrying robot 404 transports the target container 402 from the waiting area to the working area of the target workstation 407, the control server 401 sends other transport instructions to the second carrying robot 404; and in response to the other transport instructions, the second carrying robot 404 places the target container 402 at a designated position in the working area, and executes transport instructions in the other transport instructions according to the indication of the other transport instructions. The worker 408 in the working area performs operations (such as picking) on the target container; the control server 401 detects that the operation on the target container 402 has been completed or the control server 401 receives the operation completion instruction sent by the worker 408, and then determines the fourth carrying robot 406 for transporting the target container 402 and the moving path of the fourth carrying robot 406 based on the shortest path principle and the working status of each carrying robot, and sends a transport instruction including the identifier of the target container 402, the moving path, the identifier of the working area and the location of the target container 402 in the storage area, etc. to the fourth carrying robot 406; and in response to the transport instruction, the fourth carrying robot 406 gets the target container 402 from the working area of the target workstation 407 according to the indication of the transport instruction, and then transports the target container 402 from the waiting area back to the position where the target container 402 is stored in the storage area.

In the technical solution provided by the embodiments of the present invention, the waiting area in the workstation is taken as the transit station that stores the target container temporarily through the control of the control server. After transporting the target container from the storage area to the waiting area of the target workstation, the first carrying robot does not need to wait in line and can perform the next transport task; the second carrying robot transports the target container from the waiting area to the working area in order to operate the target container; and then at least one second carrying robot cooperates with each other to transport the target container from the working area back to the storage area. Compared with the existing transport solution of the carrying robot, the carrying robot is always in a highly operating state, improving the working efficiency of the carrying robot.

Third Embodiment

Figure 4:
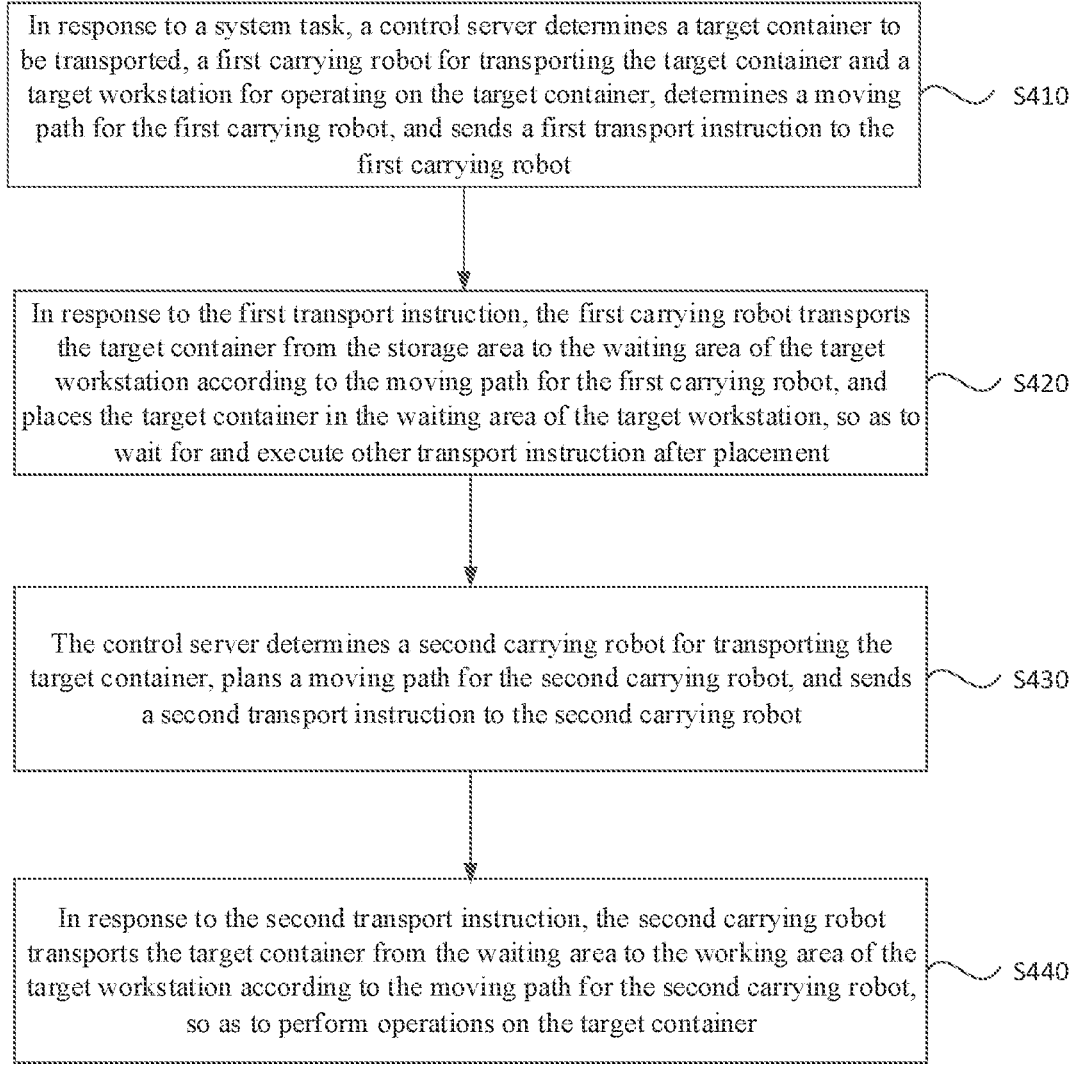
FIG. 4 is a flowchart of a goods transport method provided in a third embodiment of the present invention.

FIG. 4 is a flowchart of a goods transport method provided by the third embodiment of the present invention. This embodiment is suitable for the case of how to improve the working efficiency of the carrying robot, and is especially suitable for solving the problem of low work efficiency because the carrying robot needs to wait in line if there is at least one carrying robot in the target workstation in the process during which the carrying robot transports the item to the working area of the target workstation. The method can be executed by the cooperation of the control server and at least one carrying robot. Referring to FIG. 4, the method specifically includes the following.

S410: in response to a system task, a control server determines a target container to be transported, a first carrying robot for transporting the target container and a target workstation for operating on the target container, determines a moving path planned for the first carrying robot, and sends a first transport instruction to the first carrying robot.

Here, the first carrying robot may be a mechanism having the carrying robot shown in FIG. 1B, or may be a mechanism having a grasping device as shown in FIG. 2B, etc. The second carrying robot has the same structure as the first carrying robot.

The first transport instruction may include the identifier of the target container, the moving path from the position of the first carrying robot to the position of the target container in the storage area, the moving path from the position of the target container in the storage area to the waiting area of the target workstation, the identifier of the target workstation, and the identifier of the waiting area, etc. The identifier of the target container may be a two-dimensional code or other graphic mark similar to a two-dimensional code, or may be an RFID or other electronic tag with a wireless transmission function similar to the RFID. The carrying robot can identify the target container through the identifier of the target container, and then perform the transport operation on the target container. The identifier of the waiting area or working area refers to a mark that uniquely refers to an area, and may be the area number, geographic location, or iconic thing such as article and the placement of article, etc.

S420: in response to the first transport instruction, the first carrying robot transports the target container from the storage area to the waiting area of the target workstation according to the planned moving path, and places the target container in the waiting area of the target workstation, so as to wait for and execute other transport instructions after placement.

Exemplarily, after the first carrying robot transports the target container from the storage area to the waiting area of the target workstation according to the planned moving path in response to the first transport instruction, the method may further include: if it is detected that there are a predetermined number of first carrying robots in the waiting area of the target workstation or the waiting time of the first carrying robot in the waiting area of the target workstation is greater than a preset duration, the control server sends other transport instructions to the first carrying robot; and after receiving other transport instructions, the first carrying robot places the target container in the waiting area of the target workstation, and performs the transport operations in other transport instructions.

Here, the predetermined number is predetermined and can be dynamically adjusted according to the actual situation; correspondingly, the preset duration is also a preset parameter and can be dynamically adjusted according to the actual situation; and exemplarily, it is also possible to adjust the predetermined number and preset duration at the same time based on the current situation of the workstation.

Optionally, the workstation may be one of a picking station, a replenishing station or a stock-taking station; and exemplarily, if the workstation is a picking station, and the control server detects that the number of first carrying robots waiting in line before this first carrying robot is greater than a set value after the first carrying robot transports the target container to the waiting area of the picking station, then it is determined that the first carrying robot is in the queuing and waiting state; if the control server detects that the number of first carrying robots waiting in line before this first carrying robot is less than or equal to the set value but the waiting time of the first carrying robot in the waiting area is longer than a preset duration, it can also be determined that the first carrying robot is in the queuing and waiting state.

It should be noted that if there is only one first carrying robot waiting in the queue but it takes the time longer than the preset duration to pick the goods transported by the first carrying robot, it can also be determined that the first carrying robot is in the queuing and waiting state.

If the target workstation is a picking station, the system task is a replenishment task. The specific operation process may be: when detecting that a certain item in the picking station needs to be replenished, the control server determines the target container associated with the item and the target workstation that needs the replenishment based on the replenishment task, selects a carrying robot from the storage area as the first carrying robot based on the shortest path principle and the working state of each carrying robot, and issues the first transport instruction including the identifier of the target container, the identifier of the target workstation, the identifier of the waiting area and the moving path to the first carrying robot; in response to the first transport instruction, the first carrying robot gets the target container associated with the replenishment task from the storage area and transports it to the waiting area of the picking station; when the control server detects that the first carrying robot transports the target container that needs to be replenished from the storage area to the waiting area of the picking station and the first carrying robot is currently in the queuing and waiting state, the control server sends other transport instructions to the first carrying robot; and in response to the other transport instructions, the first carrying robot places the target container at a designated position in the waiting area and performs the transport operations in other transport instructions.

S430: the control server determines a second carrying robot for transporting the target container, plans a moving path for the second carrying robot, and sends a second transport instruction to the second carrying robot.

In this embodiment, the second transport instruction may include the identifier of the target container, the moving path from the location of the second carrying robot to the target container in the waiting area, the moving path from the target container in the waiting area to the worker in the working area, and the identifier of the working area and the identifier of the waiting area, etc.

It should be noted that the step S430 in which the control server determines the second carrying robot and the moving path thereof may be performed when the control server determines the first carrying robot and the moving path thereof in response to the system task in step S410; or may be performed when the control server detects that the first carrying robot has transported the target container to the waiting area of the target workstation or is about to transport it to the waiting area of the target workstation after step S420; or when the control server detects that the target workstation needs to operate the item in the target container, the second carrying robot for transporting the target container and the moving path of the second carrying robot are determined in real time according to the shortest path principle and the working status of each carrying robot.

For example, when the control server receives the processing instruction corresponding to the target container sent by the picking station or the control server detects that the target workstation needs to replenish the item in the target container, the control server randomly selects a carrying robot in the idle state from the carrying robots closest to the working area as the second carrying robot and issues a second transport instruction to the second carrying robot.

S440: in response to the second transport instruction, the second carrying robot transports the target container from the waiting area to the working area of the target workstation according to the planned moving path, so as to perform operations on the target container.

In the technical solution provided by the embodiments of the present invention, the waiting area in the workstation is taken as the transit station that stores the target container temporarily through the control of the control server. After transporting the target container from the storage area to the waiting area of the target workstation, the first carrying robot does not need to wait in line and can perform the next transport task; and the second carrying robot transports the target container from the waiting area to the working area in order to operate the target container. Compared with the existing transport solution of the carrying robot, the carrying robot is always in a highly operating state, improving the working efficiency of the carrying robot.

Fourth Embodiment

Figure 5:
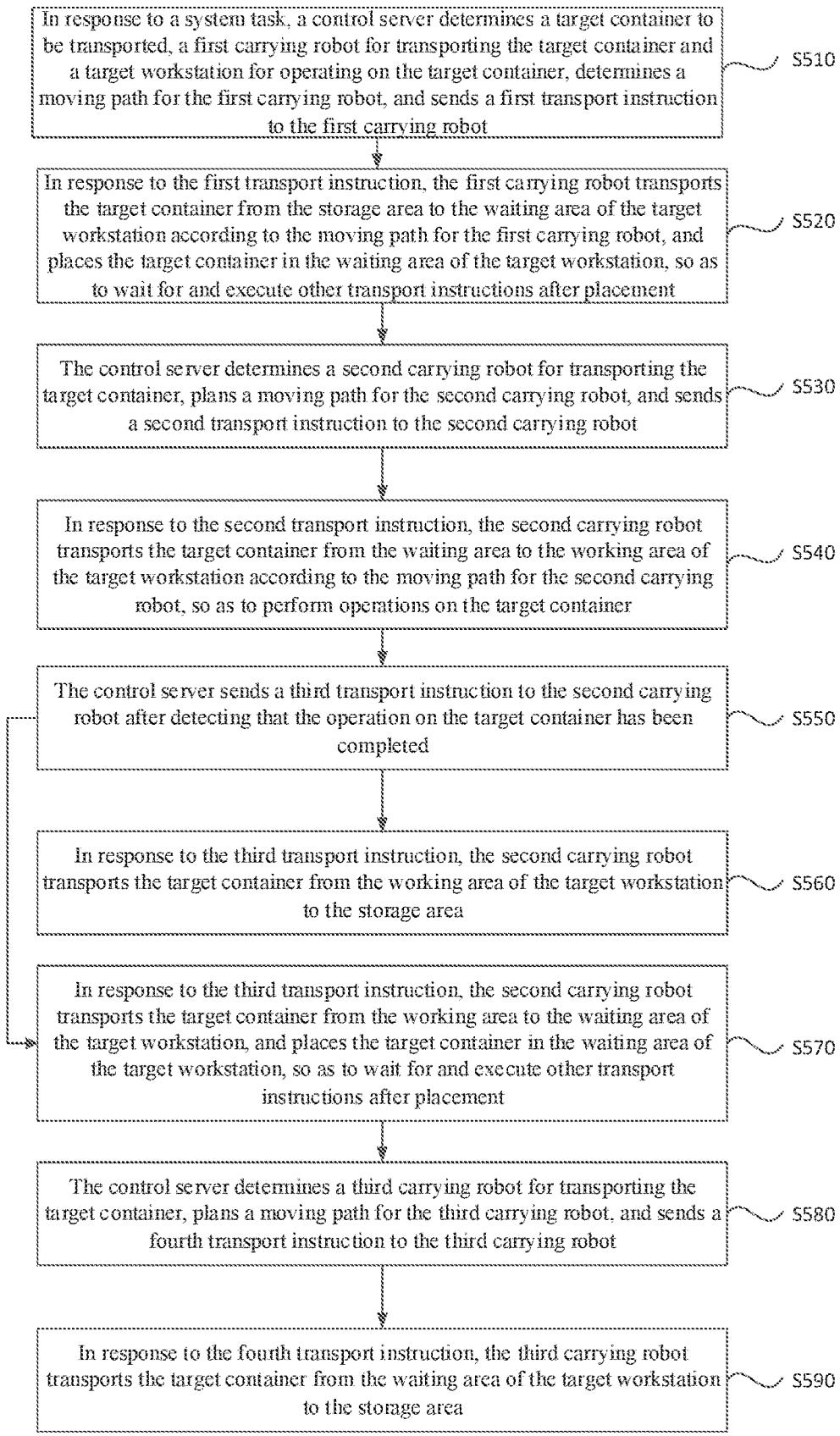
FIG. 5 is a flowchart of a goods transport method provided in a fourth embodiment of the present invention.

FIG. 5 is a flowchart of a goods transport method provided by the fourth embodiment of the present invention. This embodiment further optimizes the operations of the second carrying robot after transporting the target container to the working area of the target workstation on the basis of the above-mentioned embodiments. Specifically, the second carrying robot may place the target container directly at the designated position of the working area, so that the worker can operate the target container, and the second carrying robot can perform other transport operations, that is, relieve the association relationship between the second carrying robot and the target container. It may also keep the docking with the target container all the time, that is, the target container always keeps the association relationship with the second carrying robot. In the operation process of the target container, the second carrying robot is always at a certain position of in the working area for waiting for the completion of the operations of the target container, or the target container is always on the second carrying robot, and the worker performs the operations on the target container directly on the second carrying robot.

This embodiment illustrates the process of transporting the target container from the working area of the target workstation to the storage area after the operation on the target container has been completed in the case when the second carrying robot keeps docking with the target container all the time in the process of operating the target container in details. Referring to FIG. 5, the method specifically includes the following.

S510: in response to a system task, a control server determines a target container to be transported, a first carrying robot for transporting the target container and a target workstation for operating on the target container, determines a moving path planned for the first carrying robot, and sends a first transport instruction to the first carrying robot.

S520: in response to the first transport instruction, the first carrying robot transports the target container from the storage area to the waiting area of the target workstation according to the planned moving path, and places the target container in the waiting area of the target workstation, so as to wait for and execute other transport instructions after placement.

S530: the control server determines a second carrying robot for transporting the target container, plans a moving path for the second carrying robot, and sends a second transport instruction to the second carrying robot.

S540: in response to the second transport instruction, the second carrying robot transports the target container from the waiting area to the working area of the target workstation according to the planned moving path, so as to perform operations on the target container.

Since the target container may be blocked by other objects or containers in the waiting area when the second carrying robot obtains the target container in the waiting area of the target workstation, the control server can send an obstruction transfer instruction to the second carrying robot at this time, and the second carrying robot transfers the obstruction in response to this instruction, to thereby get the target container. Exemplarily, the method may further include: when detecting that the target container is blocked by an obstructing article or container in the waiting area from the first preset channel, the control server sends an obstruction transfer instruction to the second carrying robot; and in response to the obstruction transfer instruction, the second carrying robot transports the obstructing article or container in accordance with the second preset channel according to the indication of the obstruction transfer instruction, so that the target container is not blocked by the obstructing article; wherein the first preset channel is the moving path from the current position of the target container to the working area of the target workstation; and the second preset channel is the moving path from the current position of the second robot to the position of the obstructing article or container.

Specifically, when the control server detects that the second carrying robot is in the waiting area of the workstation, it cannot obtain the target container according to the current position of the target container in the first preset channel, that is, there are other articles or containers blocking the second carrying robot from obtaining the target container in the first preset channel, and the control server will issue an obstruction transfer instruction including the second preset channel to the second carrying robot; and in response to the obstruction transfer instruction, the second carrying robot moves the obstructing article in accordance with the second preset channel to thereby obtain the target container, and transports the target container to the working area of the target workstation according to the first preset channel.

S550: the control server sends a third transport instruction to the second carrying robot after detecting that the operation on the target container has been completed.

It should be noted that the second carrying robot may perform the operation of step S560 or the operation of step S570 after receiving the transport instruction. The specific operation can be determined depending on whether the working area of the carrying robot is divided in the transport system and the working status of each carrying robot.

S560: in response to the third transport instruction, the second carrying robot transports the target container from the working area of the target workstation to the storage area.

S570: in response to the third transport instruction, the second carrying robot transports the target container from the working area to the waiting area of the target workstation, and places the target container in the waiting area of the target workstation, so as to wait for and execute other transport instructions after placement.

S580: the control server determines a third carrying robot for transporting the target container, plans a moving path for the third carrying robot, and sends a fourth transport instruction to the third carrying robot.

S590: in response to the fourth transport instruction, the third carrying robot transports the target container from the waiting area of the target workstation to the storage area.

In the technical solution provided by the embodiments of the present invention, the waiting area in the workstation is taken as the transit station that stores the target container temporarily through the control of the control server. After transporting the target container from the storage area to the waiting area of the target workstation, the first carrying robot does not need to wait in line and can perform the next transport task; the second carrying robot transports the target container from the waiting area to the working area in order to operate the target container; and then at least one second carrying robot cooperates with each other to transport the target container from the working area back to the storage area. Compared with the existing transport solution of the carrying robot, the carrying robot is always in a highly operating state, improving the working efficiency of the carrying robot.

Exemplarily, if the second carrying robot transports the target container from the waiting area to the work area of the target workstation according to the planned moving path in response to the second transport instruction, the method further includes: the control server sends a placing instruction to the second carrying robot; and the second carrying robot places the target container in the working area of the target workstation, so as to wait for and execute other transport instructions after placement.

At this time, after the second carrying robot places the target container in the working area of the workstation, the method may further include: the control server determines a fourth carrying robot for transporting the target container, plans a moving path for the fourth carrying robot, and sends a fifth transport instruction to the fourth carrying robot; and the fourth carrying robot transports the target container from the working area of the target workstation to the storage area in response to the fifth transport instruction.

The present invention further provides a goods transport control method, which is applied to the control server side and includes:

in response to a system task, determining a target container to be transported, first and second carrying robots for transporting the target container and a target workstation for operating on the target container, determining a moving path planned for the first carrying robot, and sending a first transport instruction to the first carrying robot, wherein the first transport instruction is used to instruct the first carrying robot to transport the target container from a storage area to a waiting area of the target workstation according to the planned moving path and place the target container in the waiting area of the target workstation;

determining a second carrying robot for transporting the target container, planning a moving path for the second carrying robot, and sending a second transport instruction to the second carrying robot, wherein the second transport instruction is used to instruct the second carrying robot to transport the target container from the waiting area to a working area of the target workstation according to the planned moving path.

The second carrying robot is controlled to keep docking with the target container all the time in the process of operating the target container.

In this embodiment, the method further includes:

after detecting that the operation on the target container has been completed, sending a third transport instruction to the second carrying robot, wherein the third transport instruction is used to instruct the second carrying robot to transport the target container from the working area of the target workstation to the storage area, or instruct the second carrying robot to transport the target container from the working area to the waiting area of the target workstation and place the target container in the waiting area of the target workstation.

In the case when the third transport instruction is used to instruct the second carrying robot to transport the target container from the working area to the waiting area of the target workstation and place the target container in the waiting area of the target workstation, the method further includes:

determining a third carrying robot for transporting the target container, planning a moving path for the third carrying robot, and sending a fourth transport instruction to the third carrying robot, wherein the fourth transport instruction is used to instruct the third carrying robot to transport the target container from the waiting area of the target workstation to the storage area.

In this embodiment, the method further includes:

sending a placing instruction to the second carrying robot according to the position information after the second carrying robot transports the target container from the waiting area to the working area of the target workstation according to the planned moving path in response to the second transport instruction, wherein the placing instruction is used to instruct the second carrying robot to place the target container in the working area of the workstation.

In this embodiment, the method further includes:

determining a fourth carrying robot for transporting the target container according to the position information of the target container after being placed by the second carrying robot in the working area of the workstation, planning a moving path for the fourth carrying robot, and sending a fifth transport instruction to the fourth carrying robot, wherein the fifth transport instruction is used to instruct the fourth carrying robot to transport the target container from the working area of the target workstation to the storage area.

In this embodiment, the method further includes:

sending other transport instructions to the first carrying robot in the case of determining that the first carrying robot is in the queuing and waiting state according to the position information after the first carrying robot transports the target container from the storage area to the waiting area of the target workstation according to the planned moving path in response to the first transport instruction, wherein the other transport instructions are used to instruct the first carrying robot to place the target container in the waiting area of the target workstation and perform the transport operations in the other transport instructions.

It can be determined that the first carrying robot is in the queuing and waiting state in the following way:

the number of first carrying robots waiting in the waiting area of the target workstation exceeds a set value; or the waiting time of the first carrying robot in the waiting area of the target workstation is greater than a preset duration.

The specific details of the goods transport control method can refer to the operations of the control server in the foregoing embodiments, and will not be repeated here.

An embodiment of the present invention further provides a carrying robot group, which includes at least two carrying robots;

where a first carrying robot in the carrying robot group is configured to: in response to a transport instruction, transport a target container from a storage area to a waiting area of a target workstation according to a planned moving path, and place the target container in the waiting area of the target workstation for waiting for and executing other transport instructions;

a second carrying robot in the carrying robot group is configured to: in response to a transport instruction, transport the target container from the waiting area to a working area of the target workstation according to a planned moving path.

The second carrying robot is further configured to: keep docking with the target container all along during an operation on the target container.

The second carrying robot is further configured to: transport the target container from the working area of the target workstation to the storage area after the operation on the target container has been completed; or the second carrying robot is further configured to: transport the target container from the working area to the waiting area of the target workstation, and place the target container in the waiting area of the target workstation for waiting for and executing other transport instructions.

In the case when the second carrying robot is further configured to transport the target container from the working area to the waiting area of the target workstation and place the target container in the waiting area of the target workstation, a third carrying robot in the robot group is configured to: in response to a transport instruction, transport the target container from the waiting area of the target workstation to the storage area.

The second carrying robot is further configured to: place the target container in the working area of the target workstation for waiting for and executing other transport instructions after transporting the target container from the waiting area to the working area of the target workstation.

A fourth carrying robot in the carrying robot group is configured to: in response to a transport instruction, transport the target container from the working area of the target workstation to the storage area.

The specific working details of the carrying robot group can refer to the foregoing embodiments, and will not be repeated here.

An embodiment of the present invention further provides an electronic device, including: one or more processors; and a storage device for storing one or more programs, wherein the one or more programs cause the one or more processors to implement the goods transport method described above when executed by the one or more processors.

An embodiment of the present invention further provides a computer readable storage medium storing a computer program thereon, wherein, the program implements the goods transport method described above when executed by a processor.

The sequence numbers of the foregoing embodiments are only for description, and do not represent the advantages and disadvantages of the embodiments.

Those ordinary skilled in the art should understand that the above modules or steps of the present invention can be implemented by a general computing device, and they can be concentrated on a single computing device or distributed on a network composed of multiple computing devices. Optionally, they can be implemented by program codes executable by a computer device so that they can be stored in a storage device for execution by the computing device, or they are fabricated respectively into individual integrated circuit modules, or multiple modules or steps of them are implemented as a single integrated circuit module. Thus, the present invention is not limited to any specific combination of hardware and software.

Various embodiments in this specification are described in a progressive manner, each embodiment focuses on the differences from other embodiments, and the same or similar parts among various embodiments can be referred to each other.

The foregoing description is only the preferred embodiments of the present invention and is not intended to limit the present invention. For those skilled in the art, the present invention can have various modifications and changes. Any modification, equivalent replacement, improvement, etc. made within the spirit and principle of the present invention should be contained in the protection scope of the present invention.

What is claimed is:

1. A goods transport system, comprising:
a control server, carrying robots, and a workstation comprising a working area and a waiting area;
wherein:
the control server is configured to: in response to a system task, determine a target container to be transported, first and second carrying robots for transporting the target container and a target workstation for operating on the target container, plan a moving path for the first carrying robot and a moving path for the second carrying robot, and send a transport instruction to the first carrying robot and send a transport instruction to the second carrying robot;

the first carrying robot is configured to: in response to a transport instruction sent to the first carrying robot, transport the target container from a storage area to a waiting area of the target workstation according to the moving path for the first carrying robot, place the target container in the waiting area of the target workstation, and wait for other transport instruction for execution;

the second carrying robot is configured to: in response to a transport instruction sent to the second robot, transport the target container from the waiting area to a working area of the target workstation according to the moving path for the second carrying robot, wherein the second carrying robot is further configured to: keep docking with the target container all along during an operation on the target container.

2. The system according to claim 1, wherein, the second carrying robot is further configured to: transport the target container from the working area of the target workstation to the storage area after the operation on the target container has been completed; or the second carrying robot is further configured to: transport the target container from the working area to the waiting area of the target workstation, and place the target container in the waiting area of the target workstation, and wait for other transport instruction for execution.

3. The system according to claim 2, wherein, in the case when the second carrying robot is further configured to transport the target container from the working area to the waiting area of the target workstation and place the target container in the waiting area of the target workstation, the control server is further configured to: determine a third carrying robot for transporting the target container, plan a moving path for the third carrying robot, and send a transport instruction to the third carrying robot;

the third carrying robot is configured to: in response to the transport instruction sent to the third carrying robot, transport the target container from the waiting area of the target workstation to the storage area.

4. The system according to claim 1, wherein, the second carrying robot is further configured to: place the target container in the working area of the target workstation, and wait for other transport instruction for execution, after transporting the target container from the waiting area to the working area of the target workstation.

5. The system according to claim 4, wherein, the control server is further configured to: determine a fourth carrying robot for transporting the target container, plan a moving path for the fourth carrying robot, and send a transport instruction to the fourth carrying robot;

the fourth carrying robot is configured to: in response to the transport instruction sent to the fourth carrying robot, transport the target container from the working area of the target workstation to the storage area.

6. The system according to claim 1, wherein, the control server is further configured to: if it is detected that there are a predetermined number of first carrying robots in the waiting area of the target workstation or waiting period of time of the first carrying robot in the waiting area of the target workstation is greater than a preset duration, send other transport instruction to the first carrying robot.

7. A goods transport method, comprising:

in response to a system task, determining, by a control server, a target container to be transported, first and second carrying robots for transporting the target container, and a target workstation for operating on the target container, determining, by a control server, a moving path for the first carrying robot, and sending, by a control server, a first transport instruction to the first carrying robot;

in response to the first transport instruction, transporting, by the first carrying robot, the target container from a storage area to a waiting area of the target workstation according to the moving path for the first carrying robot, placing, by the first carrying robot, the target container in the waiting area of the target workstation, and waiting for other transport instruction for execution;

determining, by the control server, a second carrying robot for transporting the target container, planning a moving path for the second carrying robot, and sending a second transport instruction to the second carrying robot;

in response to the second transport instruction, transporting, by the second carrying robot, the target container from the waiting area to a working area of the target workstation according to the moving path for the second carrying robot, wherein the second carrying robot keeps docking with the target container all along during an operation on the target container.

8. The method according to claim 7, wherein, the method further comprises:

sending, by the control server, a third transport instruction to the second carrying robot, after detecting that the operation on the target container has been completed;

in response to the third transport instruction, transporting, by the second carrying robot, the target container from the working area of the target workstation to the storage area, or in response to the third transport instruction, transporting, by the second carrying robot, the target container from the working area to the waiting area of the target workstation, and placing, by the second carrying robot, the target container in the waiting area of the target workstation, so as to wait for and execute other transport instruction after placement.

9. The method according to claim 8, wherein, after the second carrying robot transports the target container from the working area to the waiting area of the target workstation and places the target container in the waiting area of the target workstation, the method further comprises:

determining, by the control server, a third carrying robot for transporting the target container, planning, by the control server, a moving path for the third carrying robot, and sending, by the control server, a fourth transport instruction to the third carrying robot;

in response to the fourth transport instruction, transporting, by the third carrying robot, the target container from the waiting area of the target workstation to the storage area.

10. The method according to claim 7, wherein, after the second carrying robot transports the target container from the waiting area to the working area of the target workstation according to the planned moving path in response to the second transport instruction, the method further comprises:

sending, by the control server, a placing instruction to the second carrying robot;

placing, by the second carrying robot, the target container in the working area of the workstation, and waiting for other transport instruction for execution.

11. The method according to claim 10, wherein, after the second carrying robot places the target container in the working area of the workstation, the method further comprises:

determining, by the control server, a fourth carrying robot for transporting the target container, planning, by the control server, a moving path for the fourth carrying robot, and sending, by the control server, a fifth transport instruction to the fourth carrying robot;

in response to the fifth transport instruction, transporting, by the fourth carrying robot, the target container from the working area of the target workstation to the storage area.

12. The method according to claim 7, wherein, after the first carrying robot transports the target container from the storage area to the waiting area of the target workstation according to the moving path for the first carrying robot in response to the first transport instruction, the method further comprises:

sending, by the control server, other transport instruction to the first carrying robot, if it is detected that there are a predetermined number of first carrying robots in the waiting area of the target workstation or a period of waiting time of the first carrying robot in the waiting area of the target workstation is greater than a preset duration;

after receiving the other transport instructions, placing, by the first carrying robot, the target container in the waiting area of the target workstation, and executing, by the first carrying robot, a transport operation in the other transport instruction.

13. A carrying robot group, comprising at least two carrying robots, wherein a first carrying robot in the carrying robot group is configured to: in response to a transport instruction for the first carrying robot, transport a target container from a storage area to a waiting area of a target workstation according to a moving path planned for the first carrying robot, place the target container in the waiting area of the target workstation, and wait for other transport instruction for execution;

a second carrying robot in the carrying robot group is configured to: in response to a transport instruction for the second carrying robot, transport the target container from the waiting area to a working area of the target workstation according to a moving path planned for the second carrying robot, wherein the second carrying robot is further configured to: keep docking with the target container all along during an operation on the target container.

14. The carrying robot group according to claim 13, wherein, the second carrying robot is further configured to: transport the target container from the working area of the target workstation to the storage area after the operation on the target container has been completed; or the second carrying robot is further configured to: transport the target container from the working area to the waiting area of the target workstation, place the target container in the waiting area of the target workstation, and wait for other transport instruction for execution.

15. The carrying robot group according to claim 14, wherein, in the case when the second carrying robot is further configured to transport the target container from the working area to the waiting area of the target workstation and place the target container in the waiting area of the target workstation, a third carrying robot in the robot group is configured to: in response to a transport instruction for the third carrying robot, transport the target container from the waiting area of the target workstation to the storage area.

16. The carrying robot group according to claim 13, wherein, the second carrying robot is further configured to: place the target container in the working area of the target workstation, wait for other transport instruction for execution after transporting the target container from the waiting area to the working area of the target workstation.

17. The carrying robot group according to claim 16, wherein, a fourth carrying robot in the carrying robot group is configured to: in response to a transport instruction for the fourth carrying robot, transport the target container from the working area of the target workstation to the storage area.

* * * * *